United States Patent [19]

Dodge et al.

[11] 4,375,164

[45] Mar. 1, 1983

[54] FORMATION TESTER

[75] Inventors: Carl Dodge, Alief; Harry D. Smith, Jr., Houston, both of Tex.

[73] Assignee: Halliburton Company, Duncan, Okla.

[21] Appl. No.: 256,447

[22] Filed: Apr. 22, 1981

[51] Int. Cl.³ .................... E21B 49/00; G01J 5/48; E21B 47/06
[52] U.S. Cl. .................................. 73/154; 73/700; 356/44; 374/136; 374/143; 374/161
[58] Field of Search ............. 73/152, 154, 355 R, 73/345, 339 R, 700; 356/44

[56] References Cited

U.S. PATENT DOCUMENTS

| | | | |
|---|---|---|---|
| 4,151,747 | 5/1979 | Gottlieb et al. | 356/44 |
| 4,195,349 | 3/1980 | Balkanli | 73/154 |
| 4,201,446 | 5/1980 | Geddes et al. | 73/355 R |
| 4,203,326 | 5/1980 | Gottlieb et al. | 356/44 |
| 4,295,739 | 10/1981 | Meltz et al. | 356/44 |

FOREIGN PATENT DOCUMENTS 1582768  1/1981  United Kingdom ............ 73/339 R

*Primary Examiner*—Howard A. Birmiel
*Attorney, Agent, or Firm*—William J. Beard

[57] ABSTRACT

A well tool for developing measurements of pressure or temperature in a well bore comprising an elongated well tool which utilizes a coherent beam of light which is applied to the ends of separate fiber optics and the other ends of the fiber optics are detected to produce an electrical signal in response to differences between the outputs of the fiber optics to the detector. For measuring pressure, one fiber optic may be coiled in a temperature insulated chamber and sense a discrete sample from the earth formations while the other fiber optic is coiled in a temperature insulated reference pressure chamber. In another embodiment both fiber optics are subjected to pressure samples from longitudinally spaced locations of the earth formations. In still another embodiment, the fiber optics are subjected to the temperature in the bore hole at longitudinally spaced locations for obtaining a temperature gradient measurement.

13 Claims, 8 Drawing Figures

FORMATION TESTER

FIELD OF THE INVENTION

This application relates to a method and apparatus for measuring parameters in well bores which traverse earth formations and more particularly, to methods and apparatus for utilizing fiber optic technology for obtaining measurements of pressure and temperature in a well bore.

BACKGROUND OF THE INVENTION

During the drilling of oil wells which traverse earth formations it is necessary to make deductive evaluations based on inferences which can be drawn from the measurement of parameters at various depths of the well bore. Obviously the degree of accuracy of the measurement of the parameters affects the validity of the deductions or calculations made from the measurements. The parameters of pressure and temperature are two significant measurements which are made in a borehole and from which evaluation of the geophysical characteristics of the contents of the earth formation can be made.

Heretofore, pressure and temperature measurements have been routinely made with a variety of tools. A well known tool for measuring pressure and for obtaining a fluid sample from the earth formations is a Formation Tester. Where the tester is adapted to obtain a number of measurements or fluid samples it is sometimes called a multiple sample formation tester. One such tool for taking multiple samples is illustrated in U.S. Pat. No. 3,780,575 issued to Harold Urbanosky on Dec. 25, 1973. As illustrated in U.S. Pat. No. 3,780,575, a Formation Tester is adapted to be lowered into a well bore on an electrical armoured cable. At the desired location in the well bore where a test is desired, a sealing pad and back-up shoe are projected into engagement with the wall of a well bore. With the formation sealed off by the sealing pad, the formation is opened to a pressure chamber in the tool for a pressure measurement and, if desired, a sampling chamber is connected to the formation to obtain a fluid sample. Typical pressure measurements are made by pressure transducer of the mechanical or piezoelectric types. A measurement obtained by such types of transducers does not have precise accuracy and produces imprecise measurements.

Temperature measurements to obtain differential temperature measurements at spaced apart locations have been difficult to obtain because of the lack of response and sensitivity.

Accordingly, it is a feature of the present invention to provide new and improved bore hole measuring apparatus in which the measurements of temperature or pressure can be made in highly accurate fashion utilizing fiber optic technology.

THE PRESENT INVENTION

The present invention is concerned with apparatus for use in a borehole for determining pressure or temperature utilizing fiber optic technology. For measuring pressure, the apparatus isolates a section of the well bore and a fluid sample is drawn from the earth formations. The fluid sample is received in a sampling chamber where it translates the pressure of the sample to a measurement chamber containing a coiled fiber optic. The pressure applied to the coiled fiber optic affects the index of refraction and the physical dimensions of the coiled fiber which produces a change in optical path length through the measurement fiber. A second reference fiber optic of equal length to the measurement fiber optic is coiled within a reference chamber at a constant pressure and temperature. Light from a coherent source is beam split and applied to each fiber optic. The outputs of the fiber optics are brought together so that an interference pattern between the beams is formed. The interference pattern will consist of a set of fringes. A detector is positioned so that one fringe is incident on the detector. The detector produces an output as a function of the pressure changes.

In another embodiment of the inventin, fluid samples are taken from spaced apart locations and separately applied to coiled fiber optics of equal length. Cyclical changes in the interference pattern fringe intensity are a function of the pressure differential of the pressure measurements. Care must be taken that the two coils are maintained at the same temperature. Barring this, a temperature correction should be made to the measurement.

In still another embodiment, coiled fiber optics are diposed in an apparatus to sense temperature at spaced apart locations. The effect of the temperature on the optic coils permits a differential temperature to be measured.

IN THE DRAWINGS

FIG. 1 schematically illustrates a well tool embodying the present invention in a well bore;

DESCRIPTION OF INVENTION

Figures 1, 4:
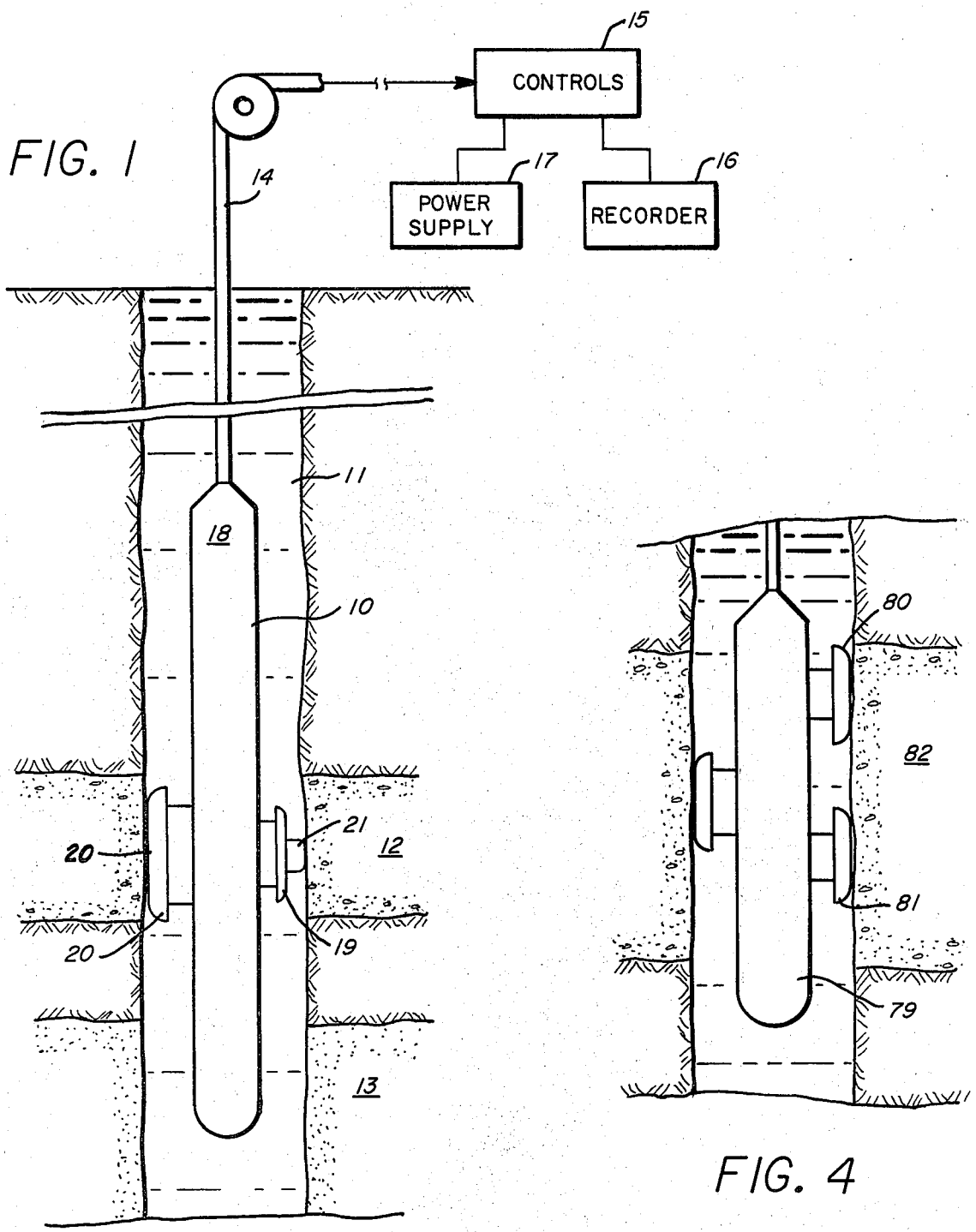
FIG. 4 is a schematic illustration of a tool for obtaining a pressure gradient measurement utilizing the present invention.

Referring now to FIG. 1, a formation testing tool 10 is illustrated in schematic form as it would appear in the course of a typical pressure measuring operation in a well bore 11. The well bore 11 traverses earth formations, including permeable formations 12 and 13, and is typically filled with a well control liquid such as mud. The testing tool 10 is sized for passage through the well bore 11, and is connected to the end of an electrical armored cable 14, which is spooled at the earth's surface in the usual fashion on a suitable winch or reel (not shown). The cable 14 also permits transmission of electrical control signals and data between the tool and the earth's surface. The electrical control system at the earth's surface includes a control system 15, a recording apparatus 16 and a power supply 17.

The tool has an elongaged body 18 which encloses the measuring system and, intermediate of the length of the tool are a selectively extendible pad and anchoring shoe 20. The pad 19 and the shoe 20 are at diametrically opposite locations on the tool body and are adapted to be extended from a retracted position with respect to the body, to an extended position in engagement with the wall of the well bore 11. In an extended position of the pad and shoe, the pad 19 has a sealing element 21 which is pressed into fluid tight engagement with the wall of the well bore so a fluid sample from the earth formation may be routed via the sealing element 21 to the interior of the tool for measurement purposes.

In the operation of the present invention, it is contemplated to place the sealing element 21 in sealing engagement with the wall of the well bore, then admit a discrete sample of fluid, measure the pressure sample of fluid, and then discharge the sample of fluid so that a subsequent measurement of pressure may be made at another location. To make the measurement at other locations, pad and shoe are retracted and the tool is moved to another location where the process is repeated.

Figure 2A:
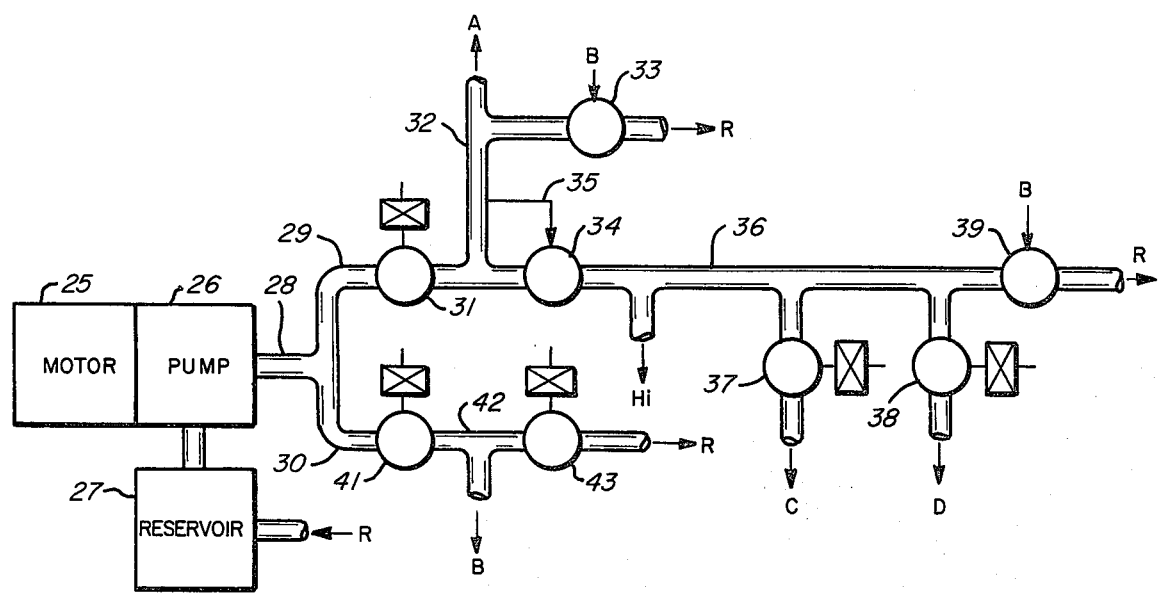
FIGS. 2A and 2B are schematic representations of a hydraulic operating system and a fluid sampling system which is compatable with the present invention.
Figure 2B:
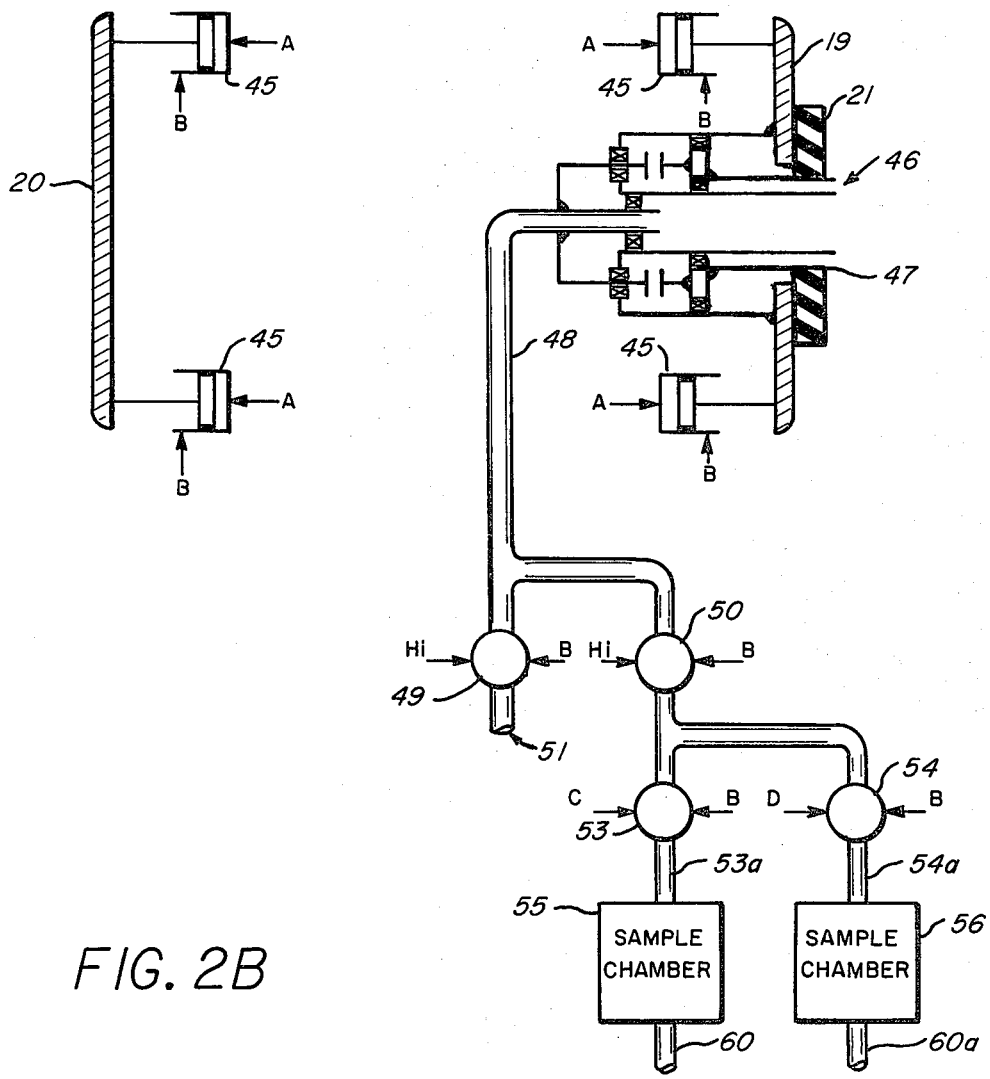

Referring now to FIGS. 2A and 2B, a schematic and simplified hydraulic control system is illustrated for operation of the formation sampler illustrated in FIG. 1. The hydraulic actuating system as shown in FIG. 2A includes an electrical driving motor as coupled to a pump 26 which supplied liquid from a closed reservoir 27 to a conduit 28. The output conduit 28 of the pump 26 is connected to a "SET" conduit 29 and a "RETRACT" conduit 30. The SET circuit 29 provides hydraulic power for moving the shoe and pad into engagement with a well bore and for operating various control valves. The RETRACT conduit 30 provides the power for retracting the shoe and pad from the well bore and for resetting various control valves.

In the SET conduit 29 is a selectively operated solenoid operated valve 31. The valve 31 is coupled to a setting power conduit 32 which is coupled to various valves, the shoe and the pad which is illustrated as schematic inputs "A". The hydraulic force applied to inputs "A" extend the pad and shoe relative to the tool body and also actuates certain valves. The setting power conduit 32 is coupled to a relief valve 33 which, when actuated, will couple the setting power conduit 32 to the reservoir for the pump as indicated by a schematic designation "R". The setting power conduit 32 is also coupled to a normally closed sample line valve 34. The sample line valve 34 is responsive to a buildup of pressure in the setting power conduit 32 and, after the pad and shoe are set on the wall of the bore holes, the pressure buildup is applied through a control line 35 to actuate the sample line valve 34 and move the sample line valve 34 from a closed to an open position.

The sample line valve 34 serves to couple the setting power conduit 32 to a sample control conduit 36. The sample control conduit 36 outputs to a valve control conduit indicated by the schematic designation "HI" and also couples to selectively controlled solenoid operated valves 37 and 38. The solenoid valves 37 and 38, when actuated, respectively provide a pressure control output indicated by the schematic designation "C" and "D". The sample control conduit 36 is also coupled to a relief valve 39 which serves to selectively recouple the conduit 36 to the reservoir by an output "R" at the completion of a test.

The RETRACT conduit 30 has a normally closed, electrically operated solenoid valve 41 which is coupled to a retract output conduit 42 which provides a hydraulic output designated as "B". The output "B" normally serves to reset valves at the end of a test. The conduit 42 is coupled to a normally closed, electrically operated solenoid valve 43 which provides a return connection to the reservoir by an output "R".

As illustrated in FIG. 2B, the pad 19 and shoe 20 are coupled to actuating cylinders 45 which receive inputs "A" and "B" and thus are extended or retracted by the functioning of the respective inputs. A tubular probe system 46 disclosed in the U.S. Pat. No. 3,780,575 may be used where a probe 47 can be projected into unconsolidated earth formations, if necessary. The probe system 46 is designed to receive a fluid sample from the earth formations sealed off by the sealing element 21 and pass the fluid sample into a fluid sample conduit 48. The fluid sample conduit 48 couples to sample conduit control valves 49 and 50. The control valve 49 is normally open to place the conduit 48 in communication with a conduit 51 which opens to the exterior of the tool and the well bore. Thus, the fluid in conduit 48 is at the well bore pressure. When the pad and shoe engage the well bore, the valve 34 is actuated and the "HI" control pressure is applied to valves 49 and 50 with the effect of closing the valve 49 and opening the normally closed valve 50. The control valve 50 is coupled to sample chamber valves 53 and 54. The sample chamber valves 53 and 54, in turn, respectively have outputs 53a and 54a to sample chambers 55 and 56. The sample chambers respectively receive a fluid sample when either of the samples valves 53 or 54 are opened. The control valves 53 and 54 are respectively opened by an input "C" or "D" from a valve 37 or 38 (FIG. 2A). The valves 49, 50, 53 and 54 are reset upon the application of a reset pressure at "B". The sample chambers 55 and 56 have output conduits 60 and 60A which can be exhausted to the exterior of the tool or into another sample chamber as will hereinafter be more fully explained.

The operation and details of the above formation tester are adequate to provide an understanding of the equipment necessary to obtain multiple samples of fluid in a bore hole for testing a parameter of the fluid.

Figure 3:
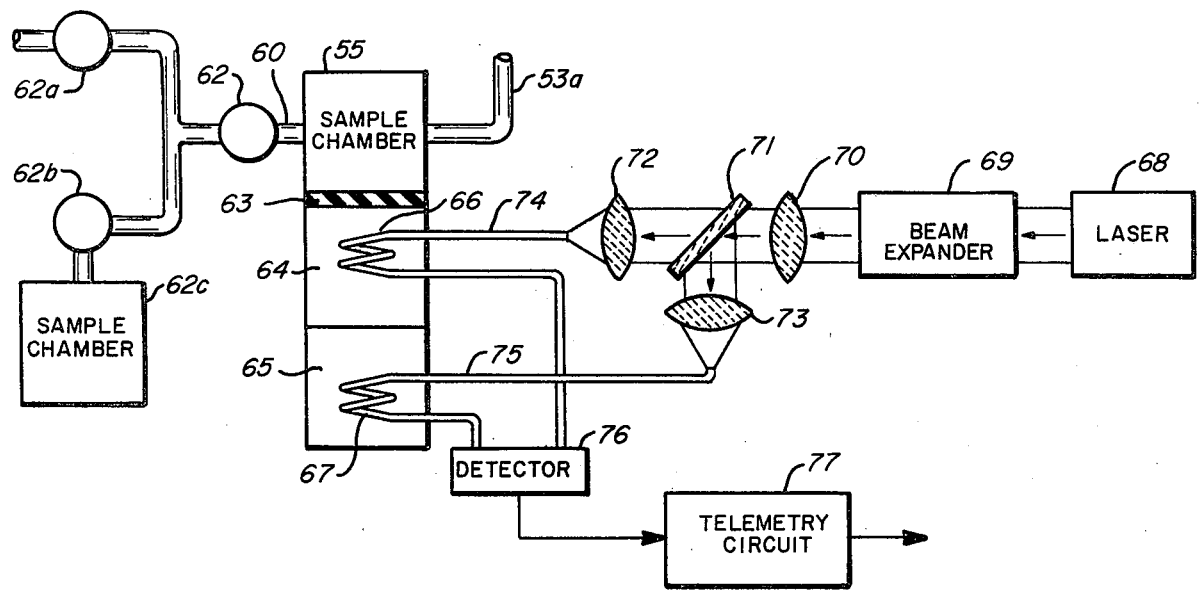
FIG. 3 is a schematic representation of one embodiment of the present invention utilizing fiber optic technology for measuring pressure.

Referring now to FIG. 3, only one of the sample chambers 55 is illustrated since a description of one chamber will suffice for the other chamber. In FIG. 3, an apparatus utilizing fiber optic technology is illustrated for measuring pressure of a fluid sample from an earth formation. As shown in FIG. 3, an input fluid sample from the earth formations is received in the conduit 53A when the valve 53 is opened. The fluid sample is conveyed by the conduit 53A to a pressure sampling chamber 55. The sampling chamber 55 has a normally closed output valve 62 and a movable diaphragm 63. The diaphragm 63 separates the sampling chamber 55 from a first measuring chamber 64 which contains a coiled measurement fiber optic 66. A second reference chamber 65 contains a coiled measurement fiber optic 67. The chambers 64 and 65 are filled with a relatively incompressible liquid which has low thermal conductivity and preferably, the chambers are thermally insulated to reduce the effects of temperature. The diaphragm 63 should also be thermally insulated. One type of insulation which can be used for the chamber is a vacuum enclosure. It is also preferable to minimize the lengths of the fiber optics outside each chamber to minimize the effects of temperature on the fiber optics. The length of coil in the chamber also affects sensitivity and the measurement sensitivity will be increased by increasing the coil in a chamber. In regard to the material of the transverse wall separating the chambers 64 and 65, the wall should be rigid and be a good thermal conductor to insure that the chambers 64 and 65 are maintained at the same temperature. If desired, an alternative is that the temperature in each of the chambers 64 and 65 be maintained constant (not necessarily the same). In this case all of the walls, including the wall between the chambers 64 and 65, would be thermal insulators. The temperature may be maintained constant through conventional heating or cooling elements referenced to maintain a constant temperature in a conventional manner.

The coiled fiber optics 66 and 67 are illuminated with a source of coherent light such as a laser 68. The light from the laser 68 is passed through a beam expander 69 and lens 70 to a beam splitter 71 which splits the beam to impinge on lenses 72 and 73. The light from the lenses 72 and 73 is respectively applied to the ends of a measurement fiber 74 and a reference fiber 75 which are approximately the same length. Any difference in the lengths of the fibers 74 and 75 must be shorter than the coherence length of the laser 68 so that interference fringes can be obtained when the outputs of the two fibers are brought together. When the two fibers are oriented, the resulting interference pattern forms a single fringe over an area larger than the detector. The outputs of the two fibers are brought together at a detector 76, such as a silicon cell or photomultiplier which has a spectral response matched to the spectral output of the laser 68. The detector compares the light intensity to a reference light intensity. The resulting output is one of two logic levels. The number of times that the light intensity cycles from a maximum level to a minimum level is then a measure of the number of one-half wavelength changes in one arm of the interferometer with respect to the second arm. The response of the detector to the input from the fibers is an electrical measurement which is converted in a conventional manner to a digital code by telemetry means 77 for transmission to the earths surface.

It will be appreciated that the above system is a form of a Mach-Zehnder interferometer and the optical pathlengths of the two single mode optical fibers are made nearly equal (to within the coherence length of the source) so that the output length of the two fibers interferes to form a series of dark and bright fringes, thus a change in the relative phase of the light from one fiber with respect to the other will result in a displacement of the fringe pattern where a phase change of two $\pi$ rad causes a displacement of one fringe. By subjecting one fiber to a dimensional and/or index of refraction change by a change in pressure on one fiber with respect to the other fiber, the difference in pressure between the two fibers appears as a displacement of the fringes and this displacement can be measured.

Referring now again to FIG. 3, when the tester apparatus is positioned in a bore hole and the earth formations are coupled to the tester, the sampling valve 55 may be opened which admits a fluid sample to the sampling chamber 55 and thereby transmits the pressure of the fluid sample to the fiber optic measurement chamber 64. The second fiber optic 67 is suitably mounted in the second enclosed, thermally insulated (except from chamber 64) reference chamber 65 and has a constant pressure as a reference. When the fluid is admitted to the sampling chamber 55, the pressure in the sampling chamber increases to reflect the pressure of the earth formation which is transmitted to the measurement chamber 64 by the diaphragm 63. Thus the change in the bulk photoelastic and elastic properties of the optical fiber 66 in the measurement chamber 64 produces a change in the refractive index and geometry of the fiber core. This results in a change in the optical path length through the length of the fiber 74. The detector 76 which is responsive to the light outputs from the fibers 74 and 75 has a spectral response which is matched to the spectral output of the coherent laser 62 source and a measurement signal as a function of pressure is transmitted by the telemetry circuit to the earth's surface.

After taking the pressure measurement, the inlet valve 53 is closed and the sample may be exhausted to the borehole or may be bypassed by the valves 62 and 62b to a sample holding chamber 62c in the tool. Thereafter, the tool may be moved to another location for another test.

Figure 5:
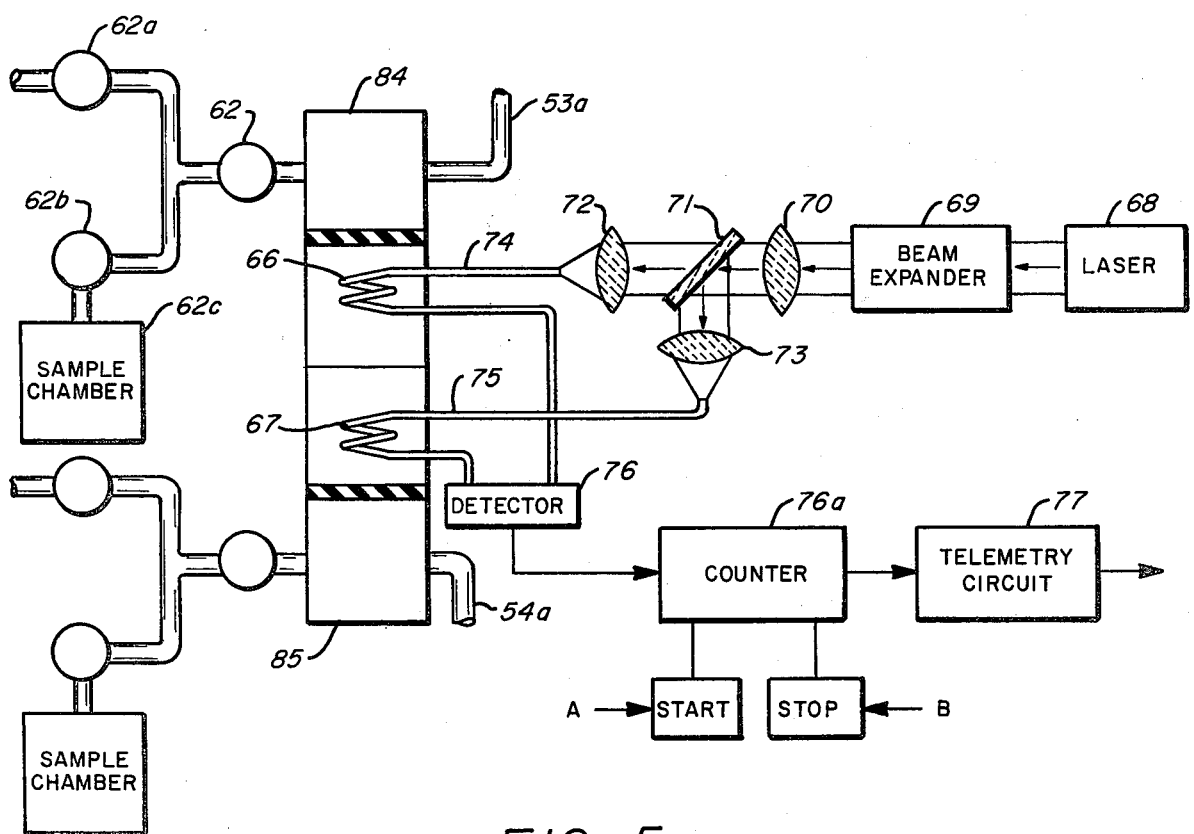
FIG. 5 is a schematic representation of another embodiment of the present invention for obtaining a pressure gradient measurement.

Referring now to FIGS. 4 and 5 another embodiment of the present invention is illustrated wherein similar members designate similar parts and functions as previously described with respect to FIGS. 2 and 3. In this embodiment the formation tester 79 has longitudinally spaced apart sample admitting means 80,81 which engage spaced apart locations of an earth formation. The sampling structure as illustrated in FIG. 5 includes two sampling chambers 84,85 which are respectively coupled to the sampling admitting means 80 and 81 so that when the sample admitting valves are opened, a flow of liquid from the respective locations adjacent to the sample admitting means 80,81 is simultaneously admitted into the chambers 84 and 85. The pressure in each of the chambers 84 and 85 produces a change in the coiled fiber optics 66 and 67 in measurement chambers. The change in the fiber optics is reflected in the outputs of the two fibers at the detector 76. The detector 76 has its output coupled to a counter 76a. The counter 76a is started by an "A" input and stopped by a "B" input. The difference in pressure between the chambers is proportional to the count in the counter 76a. The "Stop" circuit also resets the counter so that it starts from zero for each measurement.

Figure 6:
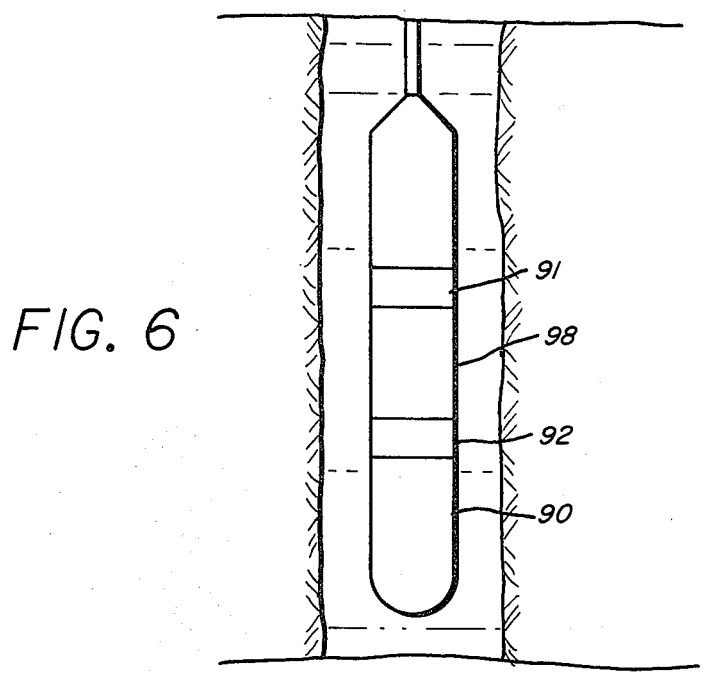
FIG. 6 is a schematic illustration of a tool for obtaining a temperature gradient measurement utilizing the principles of the present invention.
Figure 7:
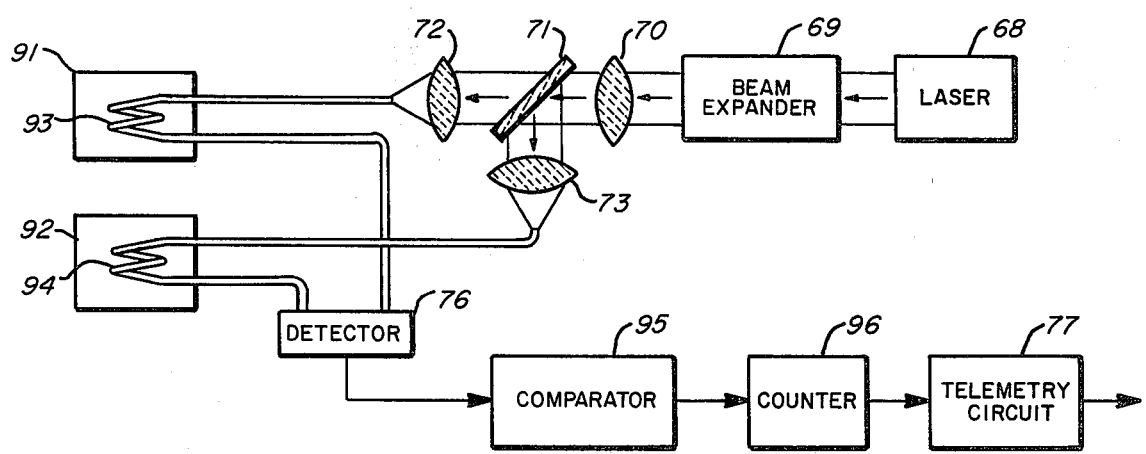
FIG. 7 is a schematic illustration of another embodiment of the present invention for obtaining a temperature gradient measurement utilizing the principles of the present invention.

Referring now to FIG. 6, in the embodiment of the invention disclosed therein, the tool 90 includes longitudinally spaced apart temperature sensors units 91 and 92 disposed in compartments. The external surface material of the compartments for the sensors units 91 and 92 is made of a high heat conductive material. The sensor units 91 and 92 are separated by thermal insulator 98. The fiber optic coils 93 and 94 are disposed within the annular walls of the compartments for the sensor units 91 and 92 so as to contact as large an area as possible so that the fiber optic is close to equal thermal equilibrium with the wall of the respective compartment units. Each compartment unit is directly in contact with the borehole liquid and maintained at a constant pressure. The coils 93 and 94 are an equal length between the beam splitter and detector 76, any distortion in the drawing being unintentional.

The temperature measurement is obtained by the fact that temperature changes the phase of the light from the fiber optics to the detector 76 and a fringe pattern corresponding to constructive and destructive interference results. The fiber outputs are arranged so that a single fringe covers a spectrally matched detector. The output from the detector 76 is supplied to a comparator 95 which outputs to a counter 96. The counter output is representative of the temperature difference between the units 91 and 92. As the tool 90 is moved along the borehole, the temperature at each sensor changes. The measurements are made as a function of depth where a constant counter output indicates no change in the thermal gradient (differential temperature). On the other hand the magnitude of the output change directly relates to the magnitude of the gradient change. If the temperature sensor 91 were maintained at a constant reference temperature, then the temperature gradient measurement herein described could be readily converted into an absolute temperature measurement at the location of the sensor 92.

While the foregoing description relates to various embodiments, other modifications will be apparent to one skilled in the art. The appended claims define the scope of the present invention.

We claim:

1. A method for measuring a parameter of the conditions in a well bore traversing earth formations comprising the steps of:
    at a first location in a well bore subjecting a first parameter sensor to a first parameter condition to be measured where said first parameter sensor is a coiled fiber optic;
    subjecting at said first location, a second parameter sensor to a second parameter condition to be measured where said second parameter sensor is a coiled fiber optic, said coiled fiber optics being substantially equal in length;
    applying a beam of coherent light to each of said fiber optics;
    comparing the output of the first and second sensors for obtaining a measurement of the difference in effect of said first and second parameters on said first and second parameter sensors;
    converting the compared output of said first and second parameter sensors into an electrical signal having a function relating to the difference in effect of said first and second parameters on said first and second parameter sensors; and
    telemetering said electrical signal to the earth's surface.

2. The method as set forth in claim 1 wherein measurements are made of said parameter as a function of depth in a well bore.

3. The method as set forth in claim 1 wherein said condition measured is pressure and said first parameter sensor measures pressure condition in the earth formations traversed by the bore hole and said second parameter sensor measures a reference pressure condition.

4. The method as set forth in claim 1 wherein said parameter condition measured is pressure and said first parameter sensor measures a pressure condition at one location in a well bore and said second pressure parameter sensor measures a pressure condition at a second location in a well bore where said second location is longitudinally spaced from said first location.

5. The method as set forth in claim 1 wherein said condition measured is temperature and said first parameter sensor measures a temperature condition at one location in a well bore and said second parameter sensor measures a temperature condition at a second location in a well bore where said second location is longitudinally spaced from said first location.

6. The method as set forth in claim 1 wherein said condition measured is temperature and said first parameter sensor measures temperature conditions in earth formations traversed by the well bore and said second pressure parameter sensor measures a reference temperature condition.

7. Apparatus for measuring a parameter of the conditions in a well bore traversing earth formations comprising:
    elongated well tool means adapted for passage through a well bore, said tool means having a first parameter sensor for measuring a first condition in a well bore;
    said first parameter sensor including a coiled fiber optic;
    said tool means having a second parameter sensor for measuring a second parameter condition in the well bore, said second parameter sensor including a coiled fiber optic, said coiled fiber optics being substantially equal in length;
    means for applying a beam of coherent light to each of said fiber optics;
    means for comparing the output of the first and second sensors for obtaining a measurement of the difference in effect of said first and second parameters on said first and second parameter sensors;
    means for converting the compared output of said first and second parameter sensors into an electrical signal having a function relating to the difference in effect of said first and second parameters on said first and second parameter sensors; and
    means for telemetering said electrical signal to the earth's surface.

8. The apparatus as set forth in claim 7 wherein said first and second parameter sensors are responsive to pressure.

9. The apparatus as set forth in claim 7 wherein said well tool means includes means for selectively coupling said first parameter sensor to earth formations defining the bore hole for measuring pressure, and said second parameter sensor is disposed in a pressure chamber which is maintained at a reference pressure condition.

10. The apparatus as set forth in claim 7 wherein said first and second parameter sensors are enclosed in thermally insulated containers.

11. The apparatus as set forth in claim 7 wherein said well tool means includes means for selectively coupling said first parameter sensor to earth formations defining the bore holes for measuring a pressure condition at one location in a well bore and means for selectively coupling said second pressure parameter sensor to earth formations defining the bore hole for measuring a pressure condition at a second location in a well bore where said second location is longitudinally spaced from said first location.

12. The apparatus as set forth in claim 7 wherein said first and second parameter sensors are responsive to temperature, where said first parameter sensor measures a temperature condition at one location in a well bore and said second pressure parameter sensor measures a temperature condition at a second location in a well bore and where said second location is longitudinally spaced from said first location.

13. The apparatus as set forth in claim 7 wherein said first sensor measures formation temperature and said second sensor measures a reference temperature in a temperature chamber maintained at a reference temperature.

* * * * *